US008526970B2

(12) United States Patent
Wala et al.

(10) Patent No.: US 8,526,970 B2
(45) Date of Patent: *Sep. 3, 2013

(54) SYSTEMS AND METHODS FOR MOBILE PHONE LOCATION WITH DIGITAL DISTRIBUTED ANTENNA SYSTEMS

(71) Applicant: ADC Telecommunications, Inc., Shakopee, MN (US)

(72) Inventors: Philip M. Wala, Savage, MN (US); Dean Zavadsky, Shakopee, MN (US)

(73) Assignee: ADC Telecommunications, Inc., Shakopee, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,535

(22) Filed: Nov. 20, 2012

(65) Prior Publication Data

US 2013/0079035 A1  Mar. 28, 2013

Related U.S. Application Data

(63) Continuation of application No. 12/555,923, filed on Sep. 9, 2009, now Pat. No. 8,346,278.

(60) Provisional application No. 61/144,257, filed on Jan. 13, 2009.

(51) Int. Cl.
*H04W 24/00* (2009.01)

(52) U.S. Cl.
USPC ............ 455/456.2; 455/456.1; 455/552.1; 455/323; 455/424; 455/16; 455/78; 455/88; 455/450; 370/503; 370/508; 370/906; 370/907; 370/347; 370/345; 370/512; 370/210; 370/320

(58) Field of Classification Search
USPC ............ 455/456.2, 127.1, 456.1, 552.1, 323, 455/424, 16, 78, 88, 450, 3.01, 414.4, 517, 455/446; 370/395.64, 503, 508, 906, 907, 370/347, 345, 512, 210, 320, 401
See application file for complete search history.

(56) References Cited

U.S. PATENT DOCUMENTS 4,183,054 A  1/1980  Patisaul et al.
4,611,323 A  9/1986  Hessenmuller
(Continued)

FOREIGN PATENT DOCUMENTS

EP  0391597  10/1990
WO  9115927  10/1991

OTHER PUBLICATIONS

U.S. Patent and Trademark Office, "Notice of Allowance", "U.S. Appl. No. 12/555,923", Aug. 24, 2012, pp. 1-13.
(Continued)

*Primary Examiner* — Joseph Arevalo
(74) *Attorney, Agent, or Firm* — Fogg & Powers LLC

(57) ABSTRACT

Methods and systems for mobile phone location within a digital distributed antenna system (DAS) are provided. In one embodiment, a method comprises: receiving a request for location services from a subscriber unit located within a digital DAS, the digital DAS including a first partition of bandwidth for transporting digitized RF signals of one or more modulated signals and a second partition of bandwidth for an Ethernet pipe transporting IP formatted data; routing the request for location services to a subscriber locator center; instructing locator receivers within a geographical area of the digital DAS to listen for a signal from the subscriber unit; listening for the signal at a first locator receiver; when the signal is observed, recording a time the signal was received and generating subscriber unit ranging data; and transmitting subscriber unit ranging data back to the subscriber locator center in an IP formatted message via the Ethernet pipe.

8 Claims, 6 Drawing Sheets

(56) References Cited

U.S. PATENT DOCUMENTS

| | | | |
|---|---|---|---|
| 4,628,501 | A | 12/1986 | Loscoe |
| 4,654,843 | A | 3/1987 | Roza et al. |
| 4,691,292 | A | 9/1987 | Rothweiler |
| 4,999,831 | A | 3/1991 | Grace |
| 5,193,109 | A | 3/1993 | Chien-Yeh Lee |
| 5,243,598 | A | 9/1993 | Lee |
| 5,321,849 | A | 6/1994 | Lemson |
| 5,339,184 | A | 8/1994 | Tang |
| 5,627,879 | A | 5/1997 | Russell et al. |
| 6,603,976 | B1 | 8/2003 | Amirijoo et al. |
| 6,704,545 | B1 | 3/2004 | Wala |
| 6,831,901 | B2 | 12/2004 | Millar |
| 6,963,552 | B2 | 11/2005 | Sabat, Jr. et al. |
| 7,039,399 | B2 | 5/2006 | Fischer |
| 7,103,377 | B2 | 9/2006 | Bauman et al. |
| 7,171,244 | B2 | 1/2007 | Bauman |
| 7,224,170 | B2 | 5/2007 | Graham et al. |
| 7,286,507 | B1 | 10/2007 | Oh |
| 7,336,961 | B1 | 2/2008 | Ngan |
| 7,583,929 | B2 | 9/2009 | Choi et al. |
| 7,668,153 | B2 | 2/2010 | Zavadsky |
| 7,948,897 | B2 | 5/2011 | Stuart et al. |
| 8,005,152 | B2 | 8/2011 | Wegener |
| 8,213,401 | B2 | 7/2012 | Fischer et al. |
| 2004/0106435 | A1 | 6/2004 | Bauman et al. |
| 2005/0186937 | A1 | 8/2005 | Graham |
| 2006/0172775 | A1 | 8/2006 | Conyers et al. |
| 2007/0008939 | A1 | 1/2007 | Fischer |
| 2008/0014948 | A1 | 1/2008 | Scheinert |
| 2008/0058018 | A1 | 3/2008 | Scheinert |
| 2008/0151846 | A1 | 6/2008 | Scheinert et al. |
| 2008/0181171 | A1 | 7/2008 | Koziy et al. |
| 2008/0181282 | A1 | 7/2008 | Wala et al. |
| 2008/0232328 | A1 | 9/2008 | Scheinert et al. |
| 2008/0267142 | A1 | 10/2008 | Mushkin et al. |
| 2009/0005096 | A1 | 1/2009 | Scheinert |
| 2009/0061940 | A1 | 3/2009 | Scheinert et al. |
| 2009/0092142 | A1 | 4/2009 | Kreiner et al. |
| 2010/0178936 | A1 | 7/2010 | Wala et al. |
| 2012/0263152 | A1 | 10/2012 | Fischer et al. |

OTHER PUBLICATIONS

U.S. Patent and Trademark Office, "Office Action", "U.S. Appl. No. 12/555,923", Mar. 29, 2012, pp. 1-32.

U.S. Patent and Trademark Office, "Supplemental Notice of Allowance", "U.S. Appl. No. 12/555,923", Sep. 26, 2012, pp. 1-6.

International Searching Authority, "International Search Report and Written Opinion", "from Foreign Counterpart of U.S. Appl. No. 12/555,923", Mailed Jul. 29, 2010, pp. 1-10, Published in: WO.

U.S. Patent and Trademark Office, "Notice of Allowance", "U.S. Appl. No. 12/555,912", Apr. 2, 2012, pp. 1-8.

U.S. Patent and Trademark Office, "Notice of Allowance", "U.S. Appl. No. 12/555,912", May 11, 2012, pp. 1-12.

U.S. Patent and Trademark Office, "Office Action", "U.S. Appl. No. 12/555,912", Feb. 2, 2012, pp. 1-32.

"CPRI Specification V1.4, Common Public Radio Interface; Interface Specification", Mar. 31, 2006, pp. 1-64, Publisher: Ericsson AB, Huawei Technologies Co. Ltd, NEC Corporation, Nortel Networks SA and Siemens AG.

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

SYSTEMS AND METHODS FOR MOBILE PHONE LOCATION WITH DIGITAL DISTRIBUTED ANTENNA SYSTEMS

CROSS-REFERENCE TO RELATED APPLICATIONS

This application is a continuation application of U.S. application Ser. No. 12/555,923, filed on Sep. 9, 2009 (pending), which, in turn, claims the benefit of U.S. Provisional Application No. 61/144,257, filed on Jan. 13, 2009, both which are incorporated herein by reference in their entirety.

This application is related to U.S. Provisional Application No. 61/144,255 filed on Jan. 13, 2009 entitled "SYSTEMS AND METHODS FOR IP COMMUNICATION OVER A DISTRIBUTED ANTENNA SYSTEM TRANSPORT", and which is incorporated herein by reference in its entirety.

This application is related to U.S. application Ser. No. 12/555,912, filed on Sep. 9, 2009, entitled "SYSTEMS AND METHODS FOR IP COMMUNICATION OVER A DISTRIBUTED ANTENNA SYSTEM TRANSPORT", which issued as U.S. Pat. No. 8,213,401 on Jul. 3, 2012, and which is incorporated herein by reference in its entirety.

BACKGROUND

A Distributed Antenna System, or DAS, is a network of spatially separated antenna nodes connected to a common node via a transport medium that provides wireless service within a geographic area or structure. Common wireless communication system configurations employ a host unit as the common node, which is located at a centralized location (for example, at a facility that is controlled by a wireless service provider). The antenna nodes and related broadcasting and receiving equipment, located at a location that is remote from the host unit (for example, at a facility or site that is not controlled by the wireless service provider), are also referred to as "remote units." Radio frequency (RF) signals are communicated between the host unit and one or more remote units. In such a DAS, the host unit is typically communicatively coupled to one or more base stations (for example, via wired connection or via wireless connection) which allow bidirectional communications between wireless subscriber units within the DAS service area and communication networks such as, but not limited to, cellular phone networks, the public switch telephone network (PSTN) and the Internet.

A problem arises with implementing emergency (e.g. 911) responses systems for wireless communication systems however, because unlike land based telephones which are each associated with a physical address, the phone number of a mobile phone calling in to report an emergency does not convey the location from which the call originates. While wireless location algorithms and systems exits, and distributed antenna systems exist, using wireless location algorithms within an area serviced by a distributed antenna system results in location ambiguity due to multiple antenna sites.

For the reasons stated above and for other reasons stated below which will become apparent to those skilled in the art upon reading and understanding the specification, there is a need in the art for systems and methods for wireless location systems within a distributed antenna system.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

SUMMARY OF THE CLAIMS

Methods and systems for mobile phone location within a digital distributed antenna system (DAS) are provided. In one embodiment, a method for gathering location data within a digital distributed antenna system comprises: receiving a request for location services from a subscriber unit located within a digital distributed antenna system, the digital distributed antenna system including a first partition of bandwidth for transporting digitized radio frequency (RF) signals of one or more modulated signals, the digital distributed antenna system further including a second partition of bandwidth for an Ethernet pipe for transporting Internet Protocol (IP) formatted data; routing the request for location services to a subscriber locator center; instructing a plurality of locator receivers within a geographical area of the digital distributed antenna system to listen for a signal from the subscriber unit; listening for the signal from the subscriber unit at a first locator receiver of the plurality of locator receivers; when the signal is observed by the first locator receiver, recording a time the signal was received and generating subscriber unit ranging data; and transmitting subscriber unit ranging data back to the subscriber locator center in an IP formatted message via the Ethernet pipe provided by the digital distributed antenna system.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
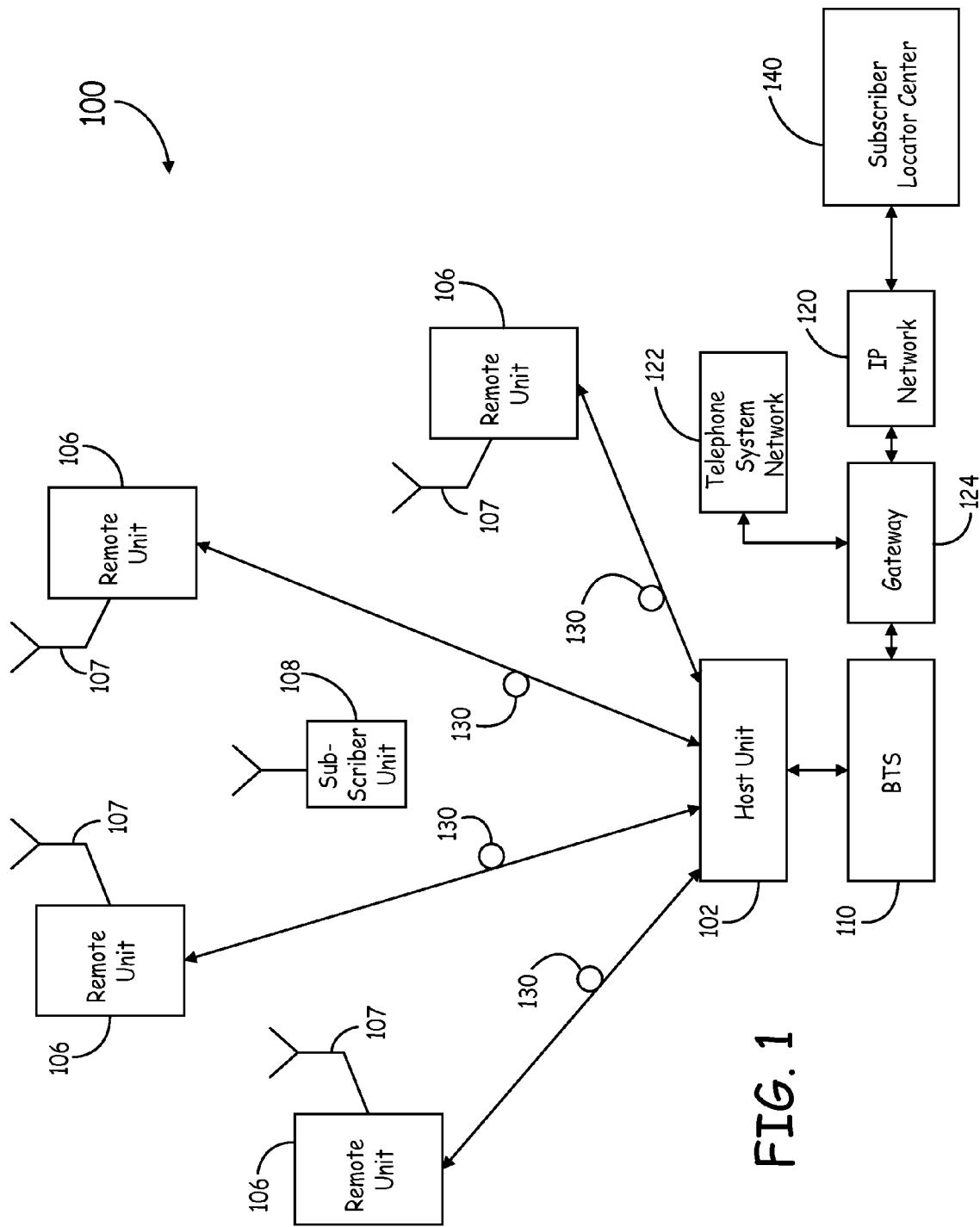
FIG. 1 is a block diagram of a distributed antenna system (DAS) of one embodiment of the present invention.

FIG. 1 is a block diagram of a distributed antenna system (DAS) 100 of one embodiment of the present invention. DAS 100 includes a host unit 102 and a plurality of remote units 106. At the physical layer, host units 102 and remote units 106 are interconnected via fiber optic cable as indicated in FIG. 1 to form a bidirectional communication link network comprising a plurality of point-to-point communication links shown at 130. Optionally, host units 102 and remote units 106 may be interconnected via coaxial cable, or a combination of both coaxial cable and fiber optic cable. Remote units 106 each house electronic devices and systems used for wirelessly transmitting and receiving modulated radio frequency (RF) communications via antenna 107 with one or more mobile subscriber units 108. Host unit 102 is coupled to at least one base transceiver station (BTS) 110 often referred to as a base station. BTS 110 communicates voice and other data signals between the respective host unit 102 and a larger communication network via a gateway 124 coupled to a telephone system network 122 (for example, the public switched telephone network and/or wireless service provider networks) and an internet protocol (IP) network 124, such as the Internet. In one embodiment, DAS 100 comprises part of a cellular telephone network and subscriber units 108 are cellular telephones.

Downlink RF signals are received from the BTS 110 at the host unit 102, which the host unit 102 uses to generate one or more downlink transport signals for transmitting to one or more of the remote units 106. Each such remote unit 106 receives at least one downlink transport signal and reconstructs the downlink RF signals from the downlink transport signal and causes the reconstructed downlink RF signals to be radiated from a remote antenna 107 coupled to or included in that remote unit 106. A similar process is performed in the uplink direction. Uplink RF signals received at one or more remote units 106 from subscriber 108 are used to generate respective uplink transport signals that are transmitted from the respective remote units 106 to the host unit 102. The host unit 102 receives and combines the uplink transport signals transmitted from the multiple remote units 106. The host unit 102 communicates the combined uplink RF signals to the BTS 110 over a broadband medium.

DAS 100 comprises a digital DAS transport meaning that the downlink and uplink transport signals transmitted between host unit 102 and remote units 106 over communication links 130 are generated by digitizing the downlink and uplink RF signals, respectively. In other words, the downlink and uplink transport signals are not analog RF signals but instead are digital data signals representing digital RF samples of a modulated RF signal. For example, if a particular communication signal destined for transmission to subscriber unit 108 is a modulated RF signal in the 900 MHz band, then host unit 102 will generate baseband digital samples of the modulated 900 MHz RF signal from BTS 110, which are then distributed by host unit 102 to the remote units 106. Alternatively, an all-digital BTS may generate baseband digital samples directly. At the remote units, the digital samples of the modulated RF signal are converted from digital into an analog RF signal to be wirelessly radiated from the antennas 107. In the uplink analog RF signals received at remote unit 106 are sampled to generate RF data samples for the uplink transport signals. BTS 110, host unit 102 and remote units 106 each accommodate processing communication signals for multiple bands and multiple modulate schemes simultaneously.

It is understood in the art that RF signals are often transported at intermediate frequencies (IF) or baseband. Therefore, within the context of this application, the terms "digital RF", "digital RF signal", "digital RF samples" and "digitized RF signals" are understood to include signals converted to IF and baseband frequencies.

In addition to communicating the downlink and uplink transport RF signals, the digital transport between host unit 102 and each remote units 106 includes sufficient bandwidth (that is, in excess of what is necessary to transport the digitized RF data samples) to implement an Ethernet pipe between each remote unit 106 and the host unit 102 for communicating subscriber unit ranging data to a subscriber locator center (SLC) 140 in communication with host unit 102 via BTS 110. In one embodiment, the Ethernet pipe provides a bandwidth of at least 100M bits/sec. By taking advantage of the distributed antenna locations within DAS 100, SLC 140 can collect subscriber unit ranging data from multiple locations within an area and determine the exact location of a subscriber unit for e911 emergency services or other applications. In one embodiment, SLC 140 pinpoints the subscriber unit using multilateration, also known as hyperbolic positioning, wherein a subscriber unit can be accurately located by computing the time difference of arrival (TDOA) of signals received by multiple remote units 106. That is, when an RF signal is transmitted by subscriber unit 108, that RF signal will reach different antennas 107 within DAS 100 at different times, depending on the range between the subscriber unit 106 and the antennas. The TDOA is the difference in time between the RF signal being received at a first antenna and the RF signal being received at a second antenna. Given the a priori known location of two antennas, and a TDOA measurement between the two antennas, the location of the subscriber unit 108 can be placed onto the surface of a hyperboloid. Additional TDOA measurements from additional antenna locations allows the location of the subscriber unit 108 to be further narrowed down based on the intersection of multiple hyperboloids. Typically, two TDOA measurements between three antennas is sufficient to locate a subscriber unit, although additional TDOA measurements and antennas will increase the accuracy of the calculation.

Figure 2:
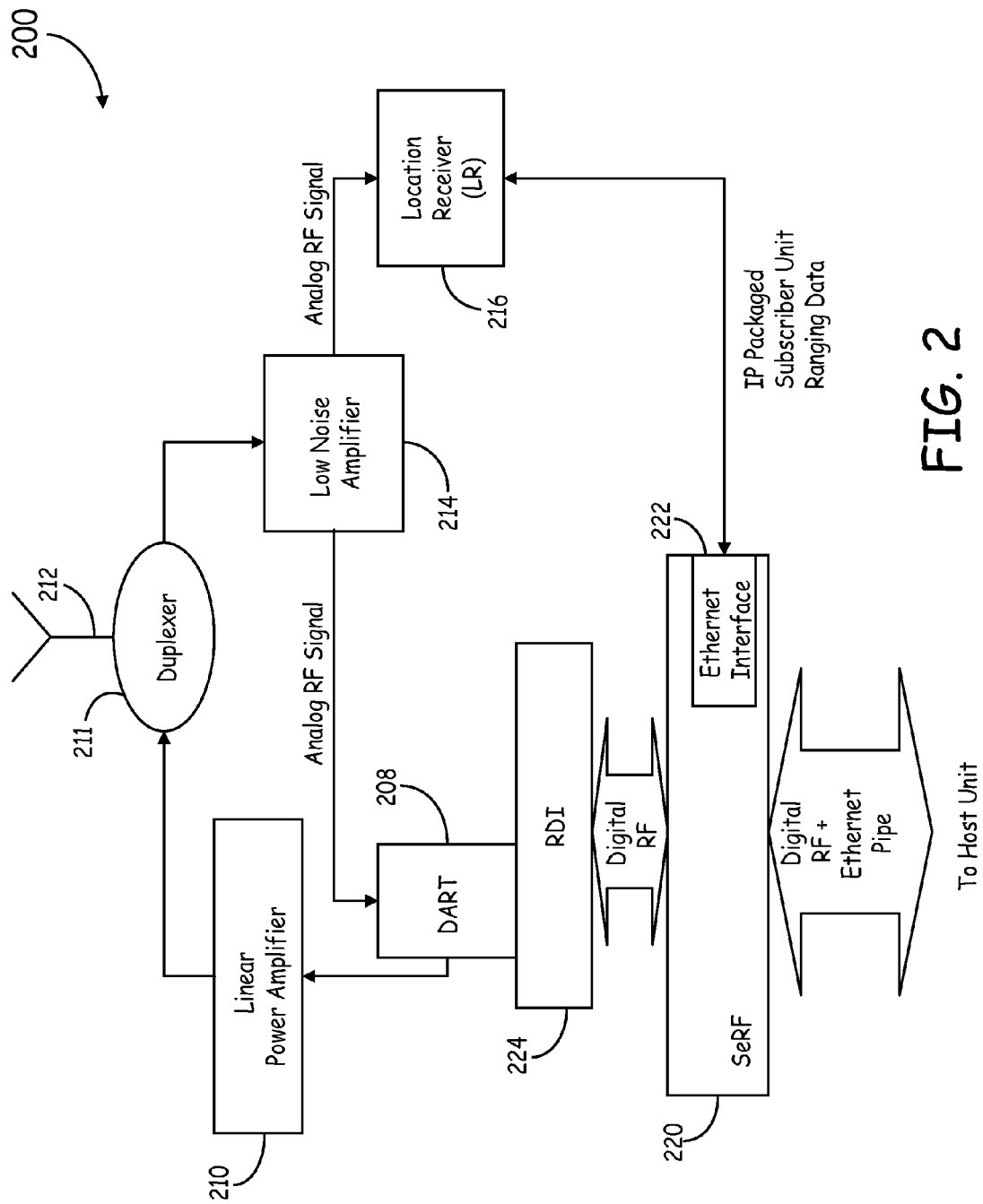
FIG. 2 is a block diagram of a remote unit of one embodiment of the present invention.

FIG. 2 is a block diagram of a remote unit 200 of one embodiment of the present invention such as the remote units 106 discussed with respect to FIG. 1. Remote unit 200 includes a serial radio frequency (SeRF) module 220, a digital to analog radio frequency transceiver (DART) module 208, a remote DART interface board (RDI) 224, a linear power amplifier 210, antenna 212, a duplexer 211, a low noise amplifier 214 and a locator receiver (LR) 216. In one embodiment, SeRF modules and DART modules and locator receivers described herein are realized using FPGAs, ASICs, digital signal processing (DSP) boards, or similar devices.

DART module 208 provides bi-directional conversion between analog RF signals and digital sampled RF for the downlink and uplink transport signals transmitted between host unit 102 and remote units 106. In the uplink, DART module 208 receives an incoming analog RF signal from subscriber unit 108 and samples the analog RF signal to generate a digital data signal for use by SeRF module 220. Antenna 212 receives the wireless RF signal from subscriber 108 which passes the RF signal to DART module 208 via low noise amplifier 214.

In the downlink direction DART module 208 receives digital sampled RF data from SeRF module 220, up converts the sampled RF data to a broadcast frequency, and converts the digital RF samples to analog RF for wireless transmission. After a signal is converted to an analog RF signal by DART module 208, the analog RF signal is sent to linear power amplifier 210 for broadcast via antenna 212. Linear power amplifier 210 amplifies the RF signal received from DART module 208 for output through duplexer 211 to antenna 212. Duplexer 211 provides duplexing of the signal which is necessary to connect transmit and receive signals to a common antenna 212. In one embodiment, low noise amplifier 214 is integrated into duplexer 211.

DART modules in a remote unit are specific for a particular frequency band. A single DART module operates over a defined band regardless of the modulation technology being used. Thus frequency band adjustments in a remote unit can be made by replacing a DART module covering one frequency band with a DART module covering a different frequency band. For example, DART module 208 is designed to transmit 850 MHz cellular transmissions. As another example, DART module 208 transmits 1900 MHz PCS signals. Some of the other options for DART modules 208 include Nextel 800 band, Nextel 900 band, PCS full band, PCS half band, BRS, WiMax, Long Term Evolution (LTE), and the European GSM 900, GSM 1800, and UMTS 2100. By allowing different varieties of DART modules 208 to be plugged into RDI 214, remote unit 102 is configurable to any of the above frequency bands and technologies as well as any new technologies or frequency bands that are developed. Also, a single remote unit may be configured to operate over multiple bands by possessing multiple DART modules. The present discussion applies to such multiple band remote units, even though the present examples focuses on a the operation of a single DART module for simplicity.

SeRF module 220 is coupled to RDI 224. RDI 224 has a plurality of connectors each of which is configured to receive a pluggable DART module 208 and connect DART module 208 to SeRF module 220. RDI 204 is a common interface that is configured to allow communication between SeRF module 220 and different varieties of DART modules 208. In this embodiment, RDI 204 is a passive host backplane to which SeRF module 220 also connects. In another embodiment, instead of being a host backplane, RDI 204 is integrated with SeRF module 220. When a remote unit operates over multiple bands by possessing multiple DART modules, RDI 204 provides separate connection interfaces allowing each DART module to communicate RF data samples with SeRF module 220. Although FIG. 2 illustrates a single SeRF module connected to a single RDI, embodiments of the present invention are not limited to such. In alternate embodiments, a SeRF module may connect to multiple RDIs, each of which can connect to multiple DARTS. For example, in one embodiment, a SeRF module can connect to up to 3 RDIs, each of which can connect to up to 2 DARTs.

SeRF module 220 provides bi-directional conversion between a serial stream of RF, IF or baseband data samples (a SeRF stream) and a high speed optical serial data stream. In the uplink direction, SeRF module 220 receives an incoming SeRF stream from DART modules 208 and sends a serial optical data stream over communication links 130 to host unit 102. In the downlink direction, SeRF module 220 receives an optical serial data stream from host unit 102 and provides a SeRF stream to DART modules 208.

Remote unit 200 further includes a location receiver (LR) 216 for generating subscriber unit ranging data used in determining the location of a subscriber unit transmitting to remote unit 200. In the embodiment shown in FIG. 2, LR 216 receives an analog signal feed of the RF signals received at remote unit 200 via antenna 212. In one embodiment, low noise amplifier 214 includes a secondary RF tap from which LR 216 receives the analog signal feed of the RF signals. LR 216 is also coupled to SeRF module 220 via an interface 222 that provides bidirectional access to the Ethernet pipe between remote unit 200 and the host unit 102. In one embodiment, interface 222 is a receptacle for a standard 8 Position 8 Contact (8P8C) modular plug and category 5/5e cable. In operation, LR 216 evaluates the RF signals received at antenna 212, looking for a signal from a particular subscriber unit, such as an individual's cellular phone for example. For example, in one embodiment, LR 216 evaluates the RF signal of a particular communication channel to make a timing measurement for a particular subscriber unit. When LR 216 finds the signal it is looking for, LR 216 generates a message indicating the time at which the signal was received at that remote unit. This message is referred to herein as subscriber unit ranging data. LR 216 formats the subscriber unit ranging data for transmission over an internet protocol (IP) network. LR 216 then outputs the subscriber unit ranging data to the SeRF module 220 which in turn routes the subscriber unit ranging data over the Ethernet pipe for transport to a subscriber locator center such as SLC 140. The digital distributed antenna system as described above thus includes a first partition of bandwidth for transporting digitized radio frequency (RF) signals and a second partition of bandwidth implementing an Ethernet pipe for transporting the subscriber unit ranging data as IP formatted data. In one embodiment LR 216 comprises a "Location Measurement Unit", or "LMU", device produced by TruePosition, Inc. and the subscriber locator center 140 comprises a Gateway Mobile Location Center produced by TruePosition, Inc.

Although FIG. 2 (discussed above), and FIGS. 4A and 4B (discussed below) each illustrates a single DART module coupled to a SeRF module, a single remote unit housing may operate over multiple bands and thus include multiple DART modules. In one such embodiment, the systems illustrated in FIGS. 2, 4A and 4B would simply be replicated once for each band. In one alternate embodiment, a SeRF module also allows multiple DART modules to operate in parallel to communicate high speed optical serial data streams over a communication link with the host unit. In one such embodiment a SeRF module actively multiplexes the signals from multiple DART modules (each DART module processing a different RF band) such that they are sent simultaneously over a single transport communication link. In one embodiment a SeRF module presents a clock signal to each DART module to which it is coupled to ensure synchronization.

Figure 3:
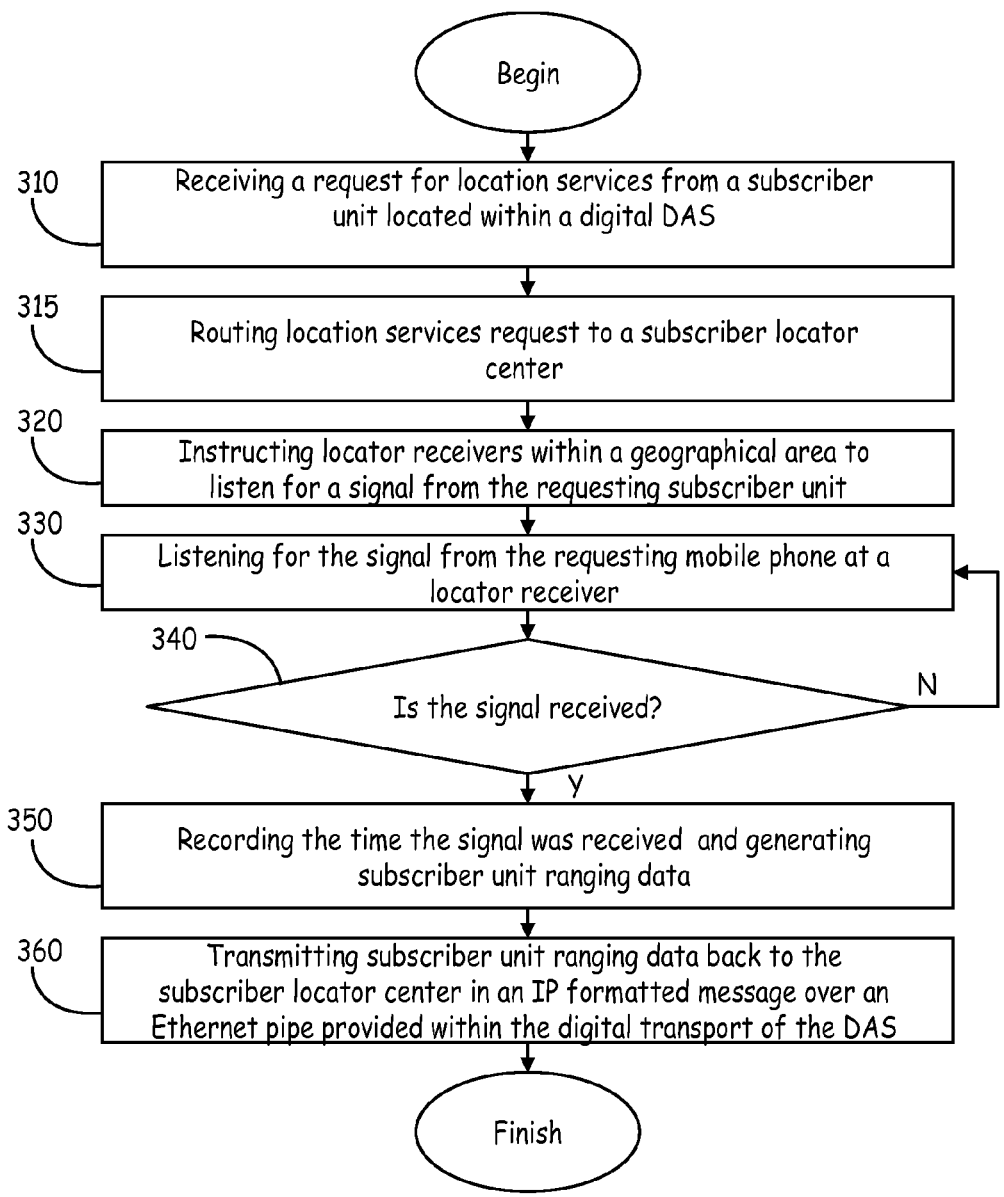
FIG. 3 is a flow chart of a method of one embodiment of the present invention.

FIG. 3 is a flow chart illustrating a method of one embodiment of the present invention. The method begins at 310 with receiving a request for location services when a subscriber unit, such as a mobile phone, requests location services from within a digital DAS. In one embodiment, the request for location services could comprise an emergency 911 call for help. In other embodiments, the request for location services would aid one or more other applications running on the mobile phone, such as, but not limited to, an application for finding nearby businesses. The location services request is received as a wireless analog RF transmission by at least one remote unit antenna of a distributed antenna system having a digital transport. That is, the downlink and uplink transport signals transmitted between the DAS host unit and the remote units are generated by digitizing the downlink and uplink RF signals, respectively. The method proceeds to 315 where the location services request is routed using standard call services to a subscriber locator center.

The method proceeds to 320 where the subscriber locator center instructs LRs located at remote units within a geographical area to listen for a signal from the requesting mobile phone. In one embodiment, the instructions to the LRs are routed to the LRs through an Ethernet pipe provided within the digital transport of the DAS. The method proceeds to 330 where the LRs listen for the signal from the requesting mobile phone. For example, in one embodiment, the LR scans the RF signal to identify an emergency 911 call from a subscriber unit. When the LRs receive the signal (determined at 340), they record the time the signal was received (350) to generate subscriber unit ranging data and send subscriber unit ranging data back to the subscriber locator center (360) by transmitting an IP formatted message over the Ethernet pipe provided within the digital transport of the DAS. In one embodiment, when the subscriber locator center receives subscriber unit ranging data from a sufficient number of LRs (typically three or more), the subscriber locator center determines the location of the mobile phone based on signal reception time data provided in the subscriber unit ranging data. In one embodiment, the subscriber locator center applies multilateration algorithms which compute the time difference of arrival (TDOA) of signals received by LRs at multiple remote units in order to determine a position estimate of the mobile phone. The position estimate may then be communicated to emergency authorities, or back to the mobile phone.

Figure 4A:
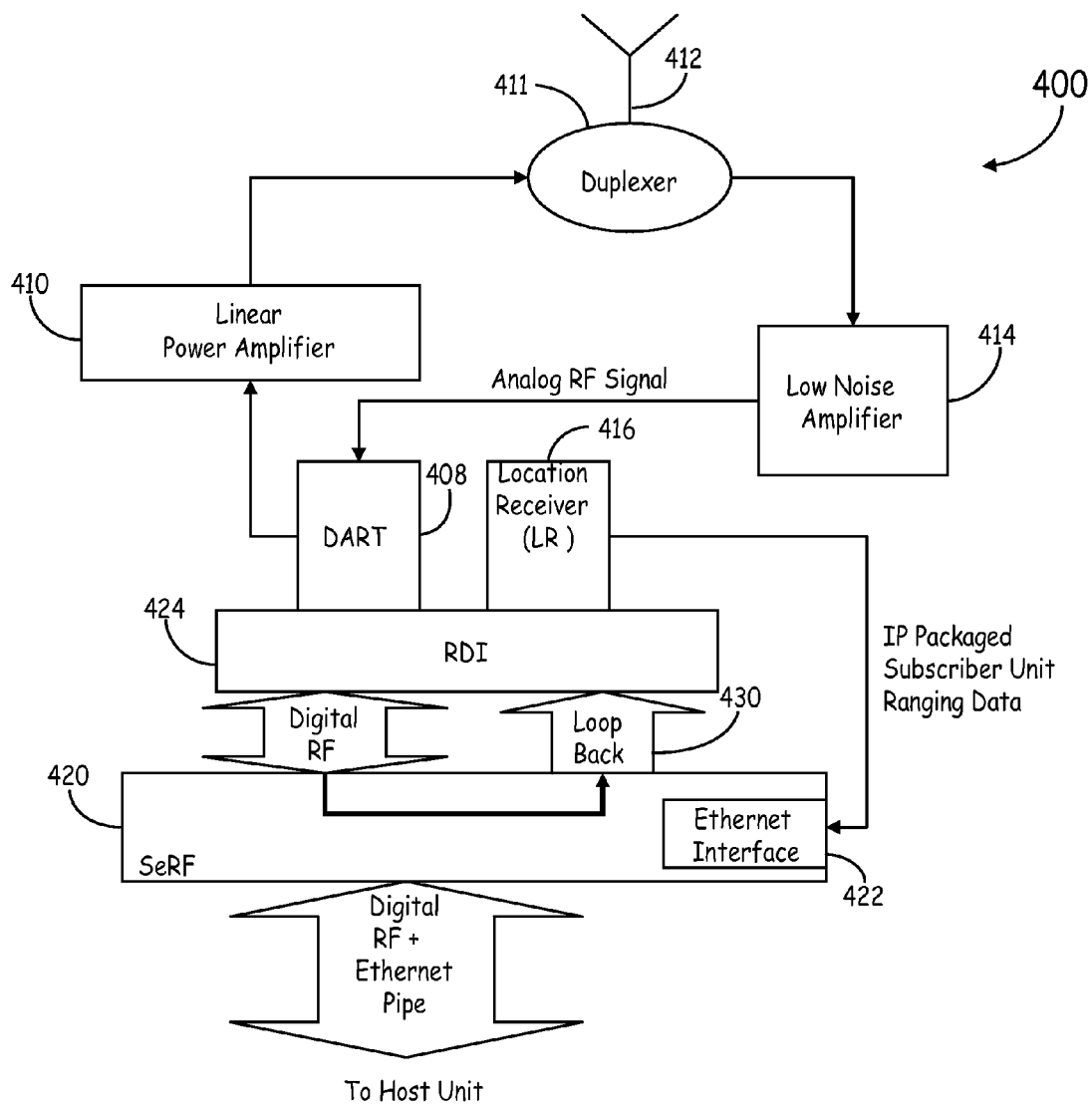
FIG. 4A is a block diagram of a remote unit of one embodiment of the present invention.
Figure 4B:
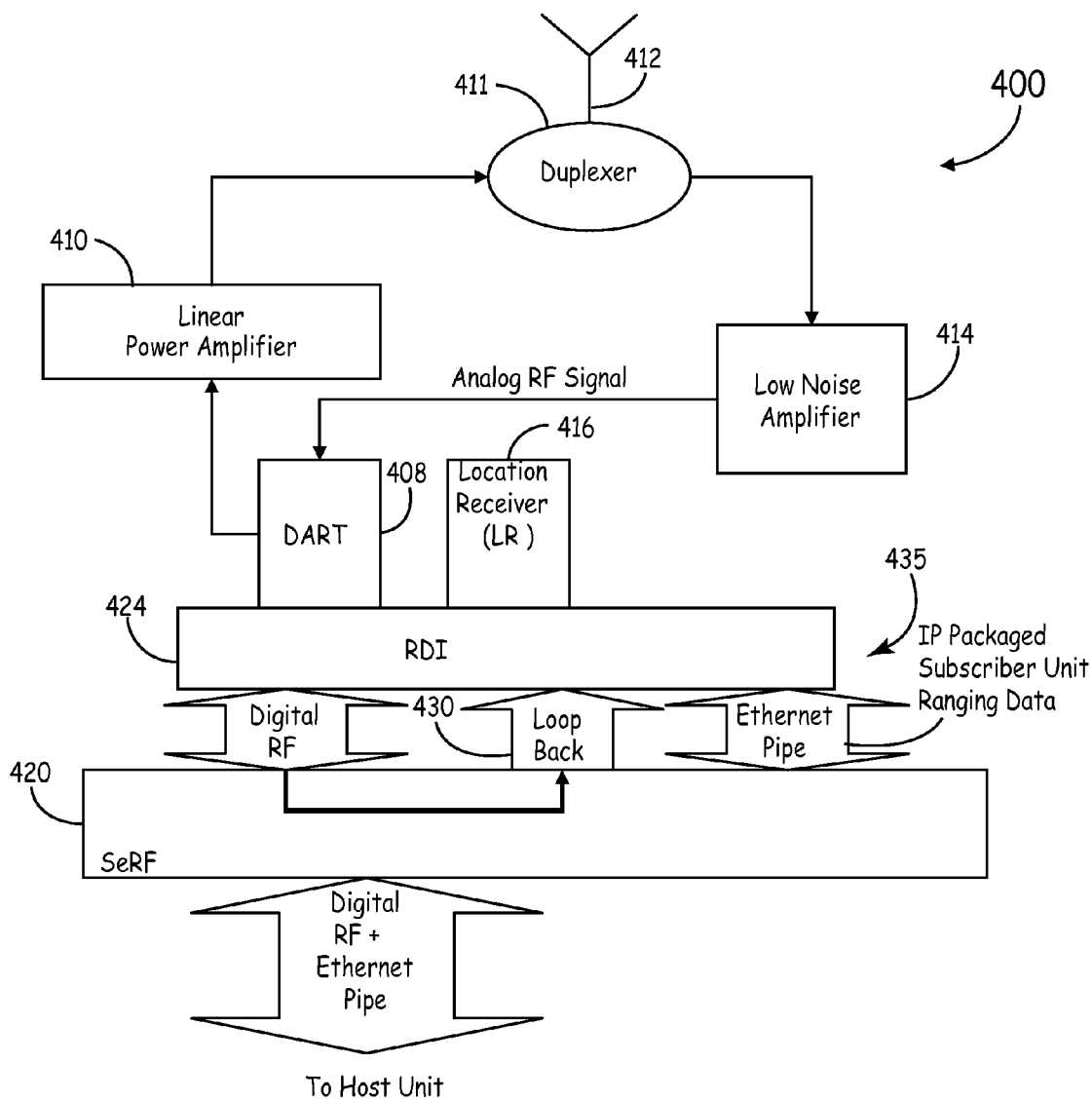
FIG. 4B is a block diagram of a remote unit of one embodiment of the present invention.

FIG. 4A is an alternate embodiment of a remote unit 400 of one embodiment of the present invention such as the remote units 106 discussed with respect to FIG. 1. Remote unit 400 includes a serial radio frequency (SeRF) module 420, a digital to analog radio frequency transceiver (DART) module 408, a RDI 424, a linear power amplifier 410, a duplexer 411, antenna 412, a low noise amplifier 414, each of which operate as discussed above with respect to FIG. 2. In one embodiment, low noise amplifier 414 is integrated into duplexer 411.

Remote unit 400 further includes a location receiver (LR) 416 for generating subscriber unit ranging data used in determining the location of a subscriber unit transmitting to remote unit 400. SeRF module 420 is coupled to a RDI 424. RDI 424 has a plurality of connectors each of which is configured to receive a pluggable DART module 408 and connect DART module 408 to SeRF module 420 as described above in FIG. 2. RDI 404 further includes at least one connector to receive LR 416. In one embodiment, LR 416 has the same form factor interface for plugging into RDI 404 as DART module 408.

In the embodiment shown in FIG. 4A, rather than receiving an analog feed of RF signals, LR 416 receives baseband data from SeRF module 420. That is, SeRF module 420 receives the digital RF samples generated by DART module 408 which have been down converted to a sampled baseband digital signal. That is, the baseband digital signal provides digital samples of a DC centered baseband RF signal for the spectrum digitized by DART module 480. SeRF module 420 includes a loop-back feature 430 to provide the sampled baseband digital signal to LR 416. Although FIG. 4A only illustrated a single DART module 420, in alternate embodiments, SeRF module 420 can loop-back sampled baseband digital signal from any number of DART modules coupled to SeRF module 420. For example, multiple DART modules could be present when a remote unit operates with RF signals transmitted and received on multiple bands.

In operation, LR 416 evaluates the sampled baseband digital signal looking for a signal from a particular subscriber unit, such as an individual's cellular phone for example. For example, in one embodiment, LR 416 scans the sampled baseband digital signal to identify an emergency 911 call from a subscriber unit. When LR 416 finds the signal it is looking for, LR 416 generates subscriber unit ranging data indicating the time at which the signal was received at that remote unit. LR 416 formats the subscriber unit ranging data for transmission over an internet protocol (IP) network and outputs the subscriber unit ranging data to the SeRF module 420 which in turn routes the subscriber unit ranging data over the Ethernet pipe for transport to a subscriber locator center such as SLC 140. DART 480 generates a fully down converted digital representation of the RF band of interest to LR 416. One advantage of having the LR evaluate a sampled baseband digital signal rather than an analog RF signal is that the LR does not need to be designed to perform the digital sampling and down converting of an analog RF signal itself, which can result in less expensive design and manufacturing costs for an LR.

In one embodiment, such as FIG. 4A, LR 416 is also coupled to SeRF module 420 via an interface 422 that provides bidirectional access to the Ethernet pipe between remote unit 400 and the host unit. In one embodiment, interface 422 is a receptacle for a standard 8 Position 8 Contact (8P8C) modular plug and category 5/5e cable. In one alternate embodiment, illustrated in FIG. 4B, bidirectional access to the Ethernet pipe between remote unit 400 and the host unit is directly accessible by LR 416 over RDI 424 shown generally at 435. In such an embodiment, SeRF module 420 would packet the subscriber unit ranging data using a MAC address, thus assigning a virtual network port associated with LR 416.

In another alternate embodiment SeRF module 420 receives the digital RF samples generated by DART module 408, which have been converted into baseband digital samples. In operation, LR 416 evaluates the baseband digital samples looking for a signal from a particular subscriber unit as described above. One of ordinary skill in the art upon reading this specification would appreciate that DART modules may function to optionally convert the digital RF samples into intermediate frequency (IF) samples instead of, or in addition to, baseband digital samples.

Figure 5:
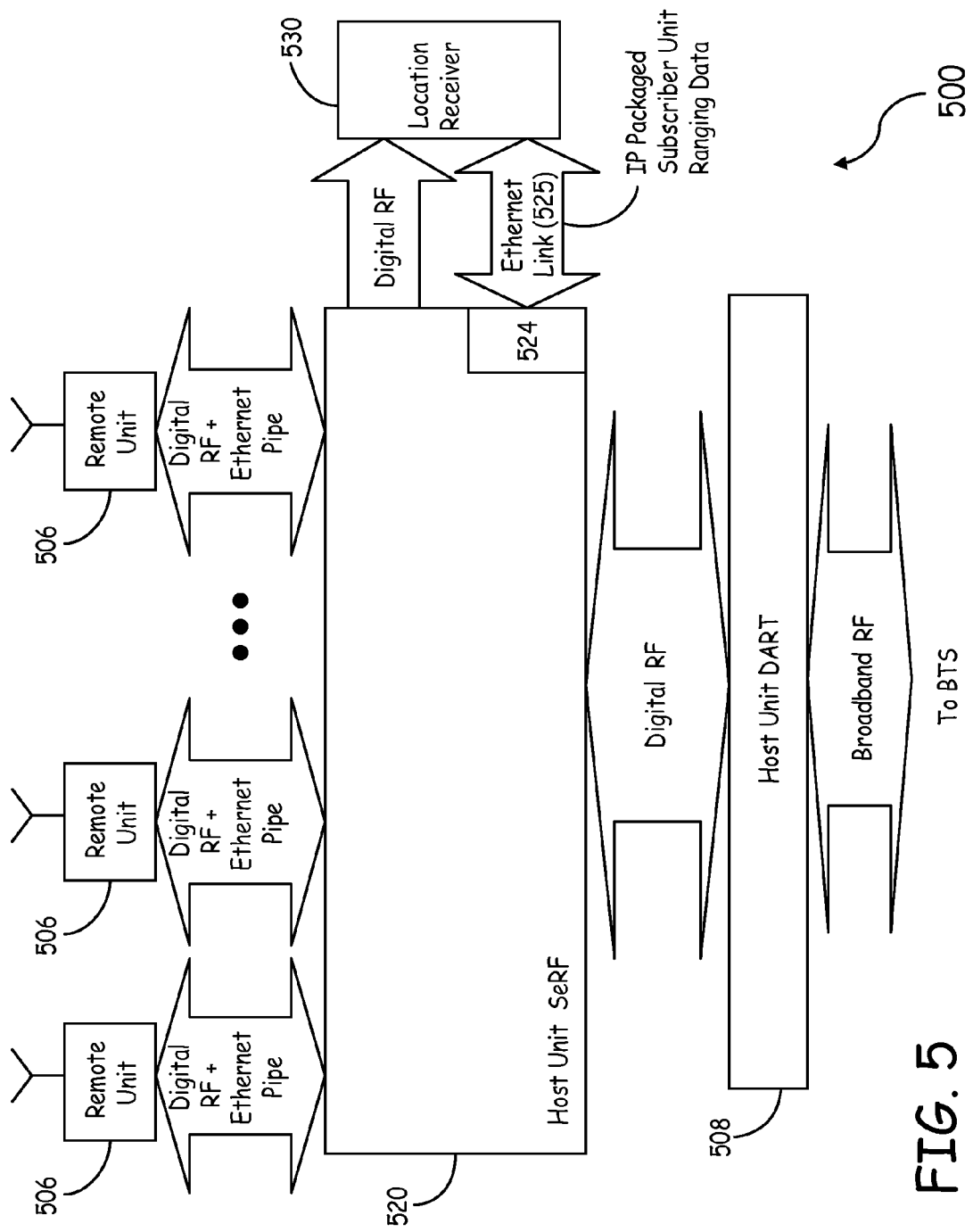
FIG. 5 is a block diagram of a host unit of one embodiment of the present invention.

Instead of generating subscriber unit ranging data at the remote units of a distributed antenna system, the same data can be generated at the host unit. For Example, FIG. 5 is a block diagram illustrating a host unit (shown generally at 500) of one embodiment of the present invention such as the host unit 102 discussed with respect to FIG. 1. Multiple remote units 506 are coupled to host unit 500, as described with respect to FIG. 1, to form a digital DAS. Host unit 500 includes a host unit digital to analog radio frequency transceiver (DART) module 508 and a host unit serial radio frequency (SeRF) module 520. SeRF module 520 provides bi-directional conversion between a serial stream of RF data samples (a SeRF stream) and the multiple high speed optical serial data streams to and from the remote units 506. Each serial optical data stream includes a digital transport for communicating downlink and uplink transport RF signals as well as an Ethernet pipe between each remote unit 506 and host unit 500. In the uplink direction, SeRF module 520 receives incoming serial optical data streams from a plurality of remote units and converts each into a serial stream of digitized baseband RF data samples, which are summed into a broadband stream of RF data samples. DART module 508 provides a bi-directional interface between SeRF module 520 and one or more base stations, such as BTS 110. As with the remote units, when host unit 520 operates over multiple bands with multiple base stations, a separate DART module 508 is provided for each frequency band. Host unit 500 also maintains an Ethernet pipe with at least one base station which provides access to at least one Internet gateway. Location Receiver (LR) 530 is coupled to an Ethernet port interface 524 of SeRF module 520 via an Ethernet link 525. Ethernet link 525 may include a local area network (LAN), wide area network (WAN) having at least one network switch for routing data between interface 524 and LR 530. LR 530 is further coupled to SeRF module 520 to receive digital RF data samples. SeRF module 520 provides LR 530 with access to the individual serial streams of RF data from remote units 506, before the data is summed into the broadband stream of RF data samples.

In operation in one embodiment, LR 530 selects one serial stream of RF data received from one of the remote units, and listens for a signal from a particular subscriber unit, such as an individual's cellular phone for example. LR 530 can observe data from any of the time slots of any of the bands operating through that remote. For example, in one embodiment, LR 530 evaluates the RF signal of a particular communication channel to make a timing measurement for a particular subscriber unit. When LR 530 finds the signal it is looking for, LR 530 generates subscriber unit ranging data indicating the time at which the signal was received at that remote unit. Because there is a propagation delay between the time an analog RF signal is received at a remote unit 506 and the time corresponding digitized RF data samples are received at host unit 500, that delay must be accounted for when generating the subscriber unit ranging data. LR 530 compensates by determining the time the digitized RF data samples are received at host unit 500 and subtracting a propagation delay time associate with that particular remote unit 506. Propagation delay times for each remote unit 506 may be either known a priori by LR 530 or periodically measured. The subscriber unit ranging data generated by LR 530 thus represents the time the RF signal was received at the remote unit. LR 530 formats the subscriber unit ranging data for transmission over an internet protocol (IP) network and outputs the subscriber unit ranging data to the SeRF module 520 which in turn routes the subscriber unit ranging data over the Ethernet pipe for transport to a subscriber locator center such as SLC 140. In one embodiment, LR 530 listens for a signal from a particular subscriber unit simultaneously on multiple serial streams of RF data from multiple remote units 506. In that case the subscriber unit ranging data generated by LR 530 is adjusted for propagation delay based on the which remote unit 506 received the corresponding analog RF signal. In one alternate embodiment, LR 530 comprises several individual location receivers each dedicated to observing signals from a specified remote unit. In one embodiment, LR 530 is remotely configurable, for example from a management interface at a subscriber locator center, to look for specific samples within a specific RF band received at a specific remote unit antenna.

Several means are available to implement the systems and methods of the current invention as discussed in this specification. In addition to any means discussed above, these means include, but are not limited to, digital computer systems, microprocessors, programmable controllers, field programmable gate arrays (FPGAs) and application-specific integrated circuits (ASICs). Therefore other embodiments of the present invention are program instructions resident on computer readable media which when implemented by such controllers, enable the controllers to implement embodiments of the present invention. Computer readable media include devices such as any physical form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

We claim:

1. A remote unit for a digital distributed antenna system, the remote unit comprising:
    a digital to analog radio frequency transceiver module for generating a digitized radio frequency signal from an analog radio frequency signal received from at least one subscriber unit;
    a locator receiver receiving the analog radio frequency signal, the locator receiver generating subscriber unit ranging data for a selected first subscriber unit of the at least one subscriber units from the analog radio frequency signal, wherein the locator receiver outputs the subscriber unit ranging data as Internet Protocol formatted data;
    a serial data stream module coupled to receive the digitized radio frequency signal from the at least one digital to analog radio frequency transceiver module, the serial data stream module further comprising an interface for receiving the Internet Protocol formatted data from the locator receiver; and
    wherein the serial data stream module outputs a serial data stream to a host unit, the serial data stream including digitized radio frequency signals corresponding to distinct spectral regions of analog radio frequency spectrum, the serial data stream further including a bidirectional Ethernet pipe for transporting the subscriber unit ranging data to the host unit as Internet Protocol formatted data.

2. The remote unit of claim 1, wherein the locator receiver formats the subscriber unit ranging data for routing to a subscriber locator center over an Internet Protocol network.

3. The remote unit of claim 1, wherein the selected first subscriber unit is selected by the locator receiver based on instructions received from a subscriber locator center via the bidirectional Ethernet pipe.

4. A remote unit for a digital distributed antenna system, the remote unit comprising:
    a digital to analog radio frequency transceiver module for generating a digitized radio frequency signal from an analog radio frequency signal received from at least one subscriber unit;
    a serial data stream module coupled to receive the digitized radio frequency signal from the digital to analog radio frequency transceiver module;
    a locator receiver coupled to the serial data stream module and receiving a loop-back of the digitized radio frequency signal from the serial data stream module, the locator receiver generating subscriber unit ranging data for a selected first subscriber unit of the at least one subscriber unit from the digitized radio frequency signal, wherein the locator receiver outputs the subscriber unit ranging data to the serial data stream module as Internet Protocol formatted data;
    wherein the serial data stream module outputs a serial data stream to a host unit, the serial stream including digitized radio frequency signals corresponding to distinct spectral regions of analog radio frequency spectrum, the serial data stream further including a bidirectional Ethernet pipe for transporting the subscriber unit ranging data to the host unit.

5. The remote unit of claim 4, wherein the digitized radio frequency signal is a baseband digitized radio frequency signal.

6. The remote unit of claim 4, wherein the digitized radio frequency signal is a downconverted intermediate frequency digitized radio frequency signal.

7. The remote unit of claim 4, the serial data stream module further comprising an interface for receiving the Internet Protocol formatted data from the locator receiver.

8. The remote unit of claim 4, wherein the interface for receiving the Internet Protocol formatted data from the locator receiver comprises an eight-position eight-contact modular plug.

* * * * *